though
3,284,433
4-PHENOXY-CARBANILIDES
Harold J. Becker, Rahway, and Edward F. Rogers, Middletown, N.J., assignors to Merck & Co., Inc., Rahway, N.J., a corporation of New Jersey
No Drawing. Filed July 17, 1963, Ser. No. 295,819
18 Claims. (Cl. 260—96.5)

This invention relates to novel compounds and to methods for producing them, to novel compositions of matter in which said compounds are present as components thereof and also to methods for using said compounds and compositions of matter. In one of its more specific aspects this invention is directed to novel carbanilide compounds and to methods for producing them, and also to novel compositions of matter, including feed and feed supplements, containing one or a combination of two or more of said carbanilide compounds as components thereof for the treatment and prevention of coccidiosis in poultry.

The novel carbanilide compounds of the present invention may be divided into two groups (1) compounds of the formula:

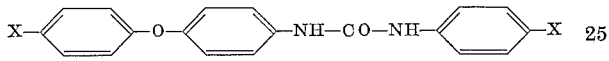

wherein each X is independently selected from the group consisting of chlorine, bromine, and nitro radical; and (2) compounds of the same formula as (1) except that a hydrogen of at least one of the rings of (1) is replaced by a substituent selected from the group consisting of chlorine, bromine, nitro and lower alkyl radicals. Examples of said lower alkyl radicals are methyl, ethyl, propyl and butyl radicals. One, two, three or four hydrogens of any 1 or 2 or all 3 of the rings of (1) are replaced by a substituent selected from the group consisting of chlorine, bromine, nitro and lower alkyl radicals. It is to be understood that when the aforesaid or similar language is employed herein or in the claims, and unless there is language clearly and unequivocally to the contrary, it shall mean and is intended to mean that when two or more of said hydrogens are replaced by one of said substituents, the substituents may be the same or different.

A preferential class of carbanilide compounds of the present invention are (a) compounds of the formula:

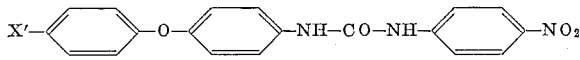

wherein X' is a halogen selected from the group consisting of chlorine and bromine; and (b) compounds of the same formula as (a) except that a hydrogen of at least 1 of the rings of (a) is replaced by a substituent selected from the group consisting of chlorine, bromine, nitro and lower alkyl radicals. Of said preferential class of carbanilide compounds, those of the following formula are especially preferred:

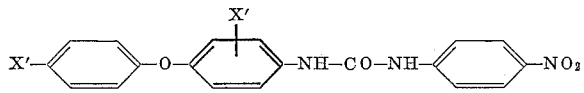

wherein each X' is independently selected from the group consisting of chlorine and bromine. Some of these especially preferred compounds as well as some of those differing therefrom by containing an additional substituent selected from the group consisting of bromine and chlorine in either one of the rings of the diphenyl ether part thereof form complexes with 2-hydroxy-4,6-dimethyl pyrimidine and dimethyl formamide respectively when mixed therewith in an inert solvent, such as methanol, or ether. These complexes are also useful as coccidiostats and represent another specific aspect of this invention.

The compounds of the present invention may be produced by (1) reacting appropriately substituted diphenyl ether amines with appropriately substituted phenyl isocyanates, or (2) by reacting appropriately substituted diphenyl ether isocyanates with appropriately substituted phenyl amines. In either procedure the amine and the isocyanate radicals of the reactants employed, react to form a —NH—CO—NH— coupling connection between the substituted diphenyl ether radical and the substituted phenyl radical of said reactants.

The substituted diphenyl ether amines and isocyanates, hereinafter referred to as Reactants (A), which may be employed as reactants herein, are (c) compounds of the formula:

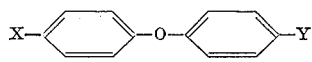

wherein X is chlorine, bromine or nitro radical, and Y is an amino or an isocyanate radical; and (d) compounds of the same formula as said (c) except that a hydrogen of at least 1 of the rings of (c) is replaced by a substituent selected from the group consisting of chlorine, bromine, nitro and lower alkyl radicals. One, two, three or four of the hydrogens in either one or both of said rings of (c) are replaced by substituents selected from the group consisting of chlorine, bromine, nitro and lower alkyl radicals.

Said Reactants (A) may be prepared by employing the classical methods for producing amino diphenyl ethers. This briefly involves the employment of the well known Ullman reaction for reacting an appropriately substituted phenol with an appropriately substituted 4-chloro-nitro-benzene in the presence of a base such as KOH and a copper powder catalyst to provide appropriately substituted 4-nitro-diphenyl ether. The diphenyl ether is subjected to hydrogen, either catalytically or chemically thereby to convert the nitro group into the amino group. When the corresponding isocyanates are desired, the amino diphenyl ethers may be subjected to the classical reaction with phosgene thereby to convert the amino radical into the isocyanate radical. The following are specific examples of some of said Reactants (A) employable as reactants herein:

4'-chloro-4-aminodiphenyl ether;
3',4'-dichloro-4-aminodiphenyl ether;
2,4'-dichloro-4-aminodiphenyl ether;
2,6,4'-trichloro-4-aminodiphenyl ether;
2,3',4'-trichloro-4-aminodiphenyl ether;
2',4'-dichloro-4-aminodiphenyl ether;
4'-nitro-4-aminodiphenyl ether;
4'-chloro-2-nitro-4-aminodiphenyl ether;
4'-chloro-2-methyl-4-aminodiphenyl ether;
4'-chloro-3-nitro-4-aminodiphenyl ether;
2',4'-dinitro-4-aminodiphenyl ether;

2'-tertiary butyl-4'-chloro-2-chloro-4-aminodiphenyl ether;
2'-methyl-4'-chloro-4-aminodiphenyl ether;
4-amino-2,4'-dibromo-diphenyl ether;
4'-chloro-2-bromo-4-aminodiphenyl ether;
4'-bromo-2-chloro-4-aminodiphenyl ether;
4-(4-chlorophenoxy) phenyl isocyanate,
known herein as Reactants (A–1)—(A–17) respectively.

The substituted phenyl amines and isocyanates hereinafter referred to as Reactants (B), which may be employed as reactants herein, are (e) compounds of the formula:

wherein X is as before defined and Y is as before defined and (f) compounds of the same formula as (e) except that at least one of the hydrogens in the ring of (e) is replaced by a substituent selected from the group consisting of chlorine, bromine, nitro and lower alkyl radicals. One, two, three or all four of the hydrogens in the ring of (e) are replaced by said substituents.

In most instances the Reactants (B) preferably employed are appropriately nuclear substituted phenyl isocyanates. Examples of some specific Reactant (B) are 4-nitrophenyl isocyanate; 3,4-dichlorophenyl isocyanate; 4-chlorophenyl isocyanate; 3,4,5-trichlorophenylisocyanate; 2-methyl-4-nitrophenyl isocyanate; 4-bromo-phenylisocyanate; 2-methyl-3-nitro-4, 5-dichlorophenyl isocyanate; 2,3,4-trichlorophenyl isocyanate; 4-nitroaniline; 3,4-dichloroaniline, known as Reactants (B–1—(B–10) respectively.

It has long been known that coccidiosis has been and still is a widespread poultry disease caused by species of protozoan parasites of the genus Eimeria. The more important of these species are *E. maxima, E. acervulina, E. tenella, E. necatrix, E. brunetti, E. praecox* and *E. mitis*. In turkeys, *E. meleagrides* and *E. adenoides* are also causative organisms of coddiciosis. When left untreated, the severe forms of the disease lead to poor weight gain, reduced feed efficiency and high mortality. For these reasons, the successful control of coccidiosis is very important to the poultry industry.

In one of the more specific aspects of this invention, said novel carbanilide compounds, including said complexes, have been found to be effective in the treatment and prevention of coccidiosis.

An object of the present invention is to provide novel carbanilide compounds, including said complexes.

Another object of this invention is to provide novel compositions of matter in which one or more of said novel carbanilide compounds, including said complexes, are present as components thereof.

A further object of this invention is the provision of animal feeds and animal feed supplements containing one or more of said novel carbanilide compounds, including said complexes, as active anticoccidial agents.

A still further object of this invention is the provision of new methods for controlling coccidiosis by the administration of said novel carbanilide compounds, including said complexes, to poultry.

The foregoing objects and advantages of this invention will become apparent from the following description.

As previously indicated the novel compounds of this invention when administered orally are effective in the treatment and prevention of coccidiosis in poultry. These compounds are most conveniently fed to poultry as a component of the feed of the animals although they may also be administered orally dispersed or admixed with the other carriers or diluents. According to one aspect of the invention, novel compositions are provided in which a novel compound of this invention is present as an anticoccidial ingredient. Such compositions comprise a novel compound of this invention intimately dispersed in or admixed with an inert carrier or diluent. By inert carrier is meant one that is substantially non-reactive with respect to the compound of this invention physically coupled therewith and that may be administered orally with safety to the animals. The preferred compositions of this type, that is, where the compound of this invention is present as an anticoccidial ingredient is intimately dispersed or suspended in or admixed with the normal elements of poultry sustenance. By normal elements of poultry sustenance is meant the feed and water normally partaken by the poultry such as grain, water and/or other liquids. However, as indicated above, compositions comprising a compound of this invention intimately dispersed in or admixed with any carrier or diluent which is substantially inert with respect thereto orally ingestable and tolerated by the animals, may be satisfactorily employed.

The amount of novel compound of this invention required for the control of coccodiosis in poultry will, of course, vary somewhat, depending upon the specific compound or combination of two or more compounds of this invention employed. In general, the compounds of this invention are effective in the prevention of that disease without undesirable side effects when administered at levels at less than 0.1% by weight of the feed. With the novel compounds of this invention, the preferred class of which are those which are shown in the third structural formula herein set forth, one X' being on a terminal ring and at the 4 position relative to the ether oxygen as shown but the other X' on the middle ring being at a certain position, namely the 2 position of said ring relative to said ether oxygen, good prophylactic results are obtained when from about 0.003% to about 0.05% by weight of the total feed consumed is administered; for most satisfactory results it is preferred that the poultry feed contain between about 0.006 and 0.025% by weight of a compound of this invention. When these novel compounds are employed as therapeutic agents it is desirable to employ the lowest levels that afford fully adequate control of coccidiosis in order to eliminate as far as possible any risk of side effects that might appear on prolonged feed of the compound.

In the preparation of solid compositions a uniform dispersion or admixture of the chosen compound of this invention throughout the carrier can be readily effected by the usual methods of grinding, stirring, milling or tumbling. By altering the amount of drug added, and the carrier used, compositions of varying concentrations may be made to suit any purpose.

According to another aspect of the invention, novel compositions are provided in which the novel anticoccidially active ingredient is present in relatively large amounts and which are suitable for addition to the poultry feed either directly or after an intermediate dilution or blending step. These compositions which are commonly referred to in the art as feed supplements and are a preferred feature of this invention provide a more convenient way of obtaining a uniform distribution in the feed of relatively small amounts of the active ingredient required for an effective dosage. Any orally ingestable solid carrier which is substantially inert with respect to the novel compound of this invention employed and tolerated by the animals may be satisfactorily employed. Examples of carriers or diluents suitable for such compositions are solid orally ingestable carriers such as distillers' dried grains, corn mean, citrus meal, fermentation residues, ground oyster shells, attapulgus clay, wheat shorts, molasses solubles, corn cob meal, edible vegetable substances, toasted dehulled soya flour, soybean mill feed, antibiotic cycelia, soya grits, crushed limestone and the like. The novel compounds of this invention are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight of coccidiostat are very satisfactory. The active novel compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

The following examples and the first table hereinafter set forth, disclose some of the compounds of this invention and also methods for producing them, all being given by way of illustration and not limitation.

*Example 1.—3-chloro-4-(4-chlorophenoxy)-4'-nitrocarbanilide*

Dissolve 80 g. of 2,4-dichloro-4-aminodiphenyl ether in 300 ml. benzene and to this add all at once a freshly filtered solution of 51 g. of 4-nitrophenylisocyanate in 150 ml. benzene. The resulting solution becomes hot and the 3-chloro-4-(4-chlorophenoxy)-4'-nitrocarbanilide quickly crystallizes as a yellow green product. Allow to stand for 5 hours then separate and collect the yellow green product and wash with ether. The resultant crude product weighs 120 g. Dissolve said 120 grams of the crude product in 1000 ml. of ethanol, filter clear through supercel, then add a little water to induce crystallization thereby to obtain 80 g. yellow crystals, melting point 212° C. Recrystallize yellow crystals from 800 ml. ethanol thereby to obtain 69 g. tan needles, melting point, 216° C., known as compound #(C–1), and whose structural formula is:

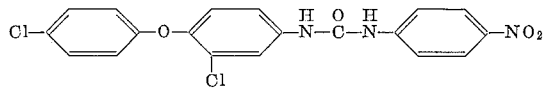

When said compound (C–1) is heated to 216° C. or slightly higher, it is in liquid condition, decomposed and then resolidifies. The resolidified compound has a melting point of 286° C.

*Example 2.—3-chloro-4-(4-chlorophenoxy)-3',4'-dichlorocarbanilide*

To a suspension of 20.5 g. 2,4'-dichloro-4-aminodiphenyl ether in 200 ml. hot dry benzene is added a freshly filtered solution of 15 g. 3,4-dichlorophenyl-isocyanate in 50 ml. benzene. Heat the reaction mixture under reflux for 15 minutes on the steam bath whereupon the 3 - chloro - 4 - (4 - chlorophenoxy) - 3',4' - dichlorocarbanilide is produced and crystallizes out. Then filter and collect said crystals and wash well with ether. Then recrystallize from ethylacetate-petroleum ether giving 21.8 g. of said carbanilide melting at 202–204° C., and is compound #(C–2).

*Example 3.—3-chloro-4-(4-chlorophenoxy)-4'-chlorocarbanilide*

To a suspension of 20 g. 2,4'-dichloro-4-aminodiphenyl ether in 200 ml. hot benzene add 20 g. 4-chlorophenylisocyanate whereupon the 3-chloro-4-(4-chlorophenoxy)-4'-chloro-carbanilide forms quickly. Allow the mixture to stand for 2 hours. Filter and collect crude carbanilide. Then recrystallize from ethylacetate-petroleum ether. It melts at 217° C., and is compound #(C–3).

*Example 4.—4-(4-chlorophenoxy)-4'-nitrocarbanilide*

Add a solution of 15 g. of 4-chlorophenoxyaniline in 100 ml. of benzene to a filtered solution of 11.5 g. of 4-nitrophenylisocyanate in 50 ml. of benzene whereupon almost immediately the carbanilide crystallizes. Filter and collect the crude carbanilide and recrystallize from 450 ml. of acetic acid thereby to obtain 19 g. of said carbanilide, melting point of 234–237° C. and is compound #(C–4).

*Example 5.—3'4'-dichloro-4-(4-chlorophenoxy) carbanilide*

Add 4.28 g. 3,4-dichlorophenyl-isocyanate to a solution of 5.0 g. 4-amino-4'-chlorodiphenyl ether in 125 ml. dry toluene thereby to produce said carbanilide appearing as crystalline material. Separate said crystalline material from the remainder of said mass by filtration. Then purify with 45 ml. of ethanol thereby to obtain 8.3 g. of said carbanilide having a melting point of 213°–214° C., and is compound #(C–5).

*Example 6.—3-methyl-4-(4-chlorophenoxy)-4'-nitrocarbanilide*

Add a freshly filtered solution of 16 g. 4-nitro-phenyl isocyanate in 100 ml. benzene to a solution of 24 g. 2-methyl-4-amino-4'-chlorodiphenyl ether in 200 ml. hot benzene. Allow the reaction mixture to stand for 24 hours in a room whose temperature is 70° F. and then filter and collect said 3-methyl-4-(4-chlorophenoxy)-4'-nitrocarbanilide produced. Recrystallize from ethanol to obtain said carbanilide in purified condition, and is compound #(C–6).

*Example 7.—3-chloro-4-(4-chlorophenoxy)-2'-methyl-4'nitrocarbanilide*

Add a solution of 17.8 g. 2-methyl-4-nitrophenyl isocyanate in 100 ml. benzene to a hot solution of 26 g. 2,4'-dichloro-4-amino-diphenyl ether in 250 ml. benzene. Allow the mixture to stand for one day at room temperature and then filter and collect the above identified carbanilide produced. Recrystallize from ethanol to obtain said carbanilide in purified condition, which is compound #(C–7).

*Example 8.—2-nitro-4-(4-chlorophenoxy)-4'-nitrocarbanilide*

Add a solution of 8.2 g. 4-nitrophenyl isocyanate in toluene to a solution of 14 g. 4-amino-3-nitro-4'-chlorodiphenyl ether in hot toluene. Allow to stand for 24 hours, then filter and collect the 2-nitro-4-(4-chlorophenoxy)-4'-nitrocarbanilide produced. Recrystallize from ethanol to obtain purified compound known as #(C–8).

*Example 9.—4-(2,4-dinitrophenoxy)-4'-nitrocarbanilide*

Add a solution of 4.1 g. 4-nitrophenyl isocyanate in toluene to a solution of 7.0 g. 2,4-dinitro-4'-aminodiphenyl ether in hot toluene, and allow to stand for 24 hours. Filter and collect the 4-(2,4-dinitrophenoxy)-4' nitrocarbanilide produced. Purify by crystallization from ethanol to obtain purified compound known as #(C–9).

The following table discloses illustrative examples of some other specific carbanilide compounds of the present invention, and shows the specific Reactants (A) and (B) for their production, recrystallization solvents, which are the solvents from which the crude carbanilides are recrystallized. Use the method of adding 1 gram mole of Reactant A suspended or dissolved in 4 times its weight of a reaction medium which is an inert organic liquid carrier for carrying Reactant A in solution or suspension and add the Reactant A in the reaction medium in hot condition to a freshly filtered solution consisting of 1 gram mole of Reactant (B) in 3 times its weight of said reaction medium. Allow to stand for 24 hours in a room whose temperature is 70° F. for the production of the carbanilide compound, then filter and collect the carbanilide compound, and recrystallize from the Recrystallization Solvent for purification. Employ hot benzene as a reaction medium in all instances except the last of the following table and in the last employ hot toluene for that purpose.

| Reactants | | Recrystallization Solvents | Compounds Produced | Melting Point, °C. | Number |
|---|---|---|---|---|---|
| (A-7) | (B-1) | Dimethyl formamide and ethanol. | 4-(4-nitrophenoxy)-4'-nitrocarbanilide | 246-251 | (C-10) |
| (A-4) | (B-1) | Ethanol | 3,5-dichloro-4-(4-chlorophenoxy)-4'-nitrocarbanilide. | 152-253 | (C-11) |
| (A-5) | (B-1) | | 3-chloro-4-(3,4-dichlorophenoxy)-4'-nitrocarbanilide. | | (C-12) |
| (A-8) | (B-1) | | 3-nitro-4-(4-chlorophenoxy)-4'-nitrocarbanilide | 295-296 | (C-13) |
| (A-2) | (B-2) | Ethyl acetate and petroleum ether. | 4-(3,4-chlorophenoxy)-3',4'-dichlorocarbanilide | 188-189 | (C-14) |
| (A-4) | (B-2) | Methanol and water | 3,5-dichloro-4-(4-chlorophenoxy)-3',4'-dichlorocarbanilide. | 223-225 | (C-15) |
| (A-5) | (B-2) | Ethanol | 3-chloro-4-(3,4-dichlorophenoxy)-3', 4'dichlorocarbanilide. | 193-194 | (C-16) |
| (A-6) | (B-2) | Ethyl acetate and petroleum ether. | 4-(2,4-dichlorophenoxy)-3',4'-dichlorocarbanilide | 186-187 | C(-17) |
| (A-7) | (B-2) | Acetic acid | 4-(4-nitrophenoxy)-3',4'-dichlorocarbanilide | 193-194 | (C-18) |
| (A-14) | (B-1) | Ethanol | 3-bromo-4-(4-bromophenoxy)-4°-nitrocarbanilide | | (C-19) |
| (A-15) | (B-1) | do | 3-bromo-4-(4-chlorophenoxy)-4'-nitrocarbanilide | | (C-20) |
| (A-16) | (B-1) | do | 3-chloro-4-(4-bromophenoxy)-4'-nitrocarbanilide | | (C-21) |
| (A-2) | (B-3) | Dimethyl formamide and ether. | 4-(3,4-dichlorophenoxy)-4'-chlorocarbanilide | 224-225 | (C-22) |
| (A-4) | (B-3) | Acetic acid | 3,5-dichloro-4-(4-chlorophenoxy)-4'-chloroanilide. | 244-246 | (C-23) |
| (A-1) | (B-4) | Ethyl acetate | 4-(4-chlorophenoxy)-3',4',5'-trichloroanilide | 222-223 | (C-24) |
| (A-2) | (B-4) | Ethyl acetate and petroleum ether. | 4-(3,4-dichlorophenoxy)-3', 4', 5'-trichloroanilide | 227-228 | (C-25) |
| (A-3) | (B-4) | Ethanol and water | 3-chloro-4-(4-chlorophenoxy)-3', 4', 5'-trichloroanilide. | 211-212 | (C-26) |
| (A-4) | (B-4) | Ethanol | 3,5-dichloro-4-(4-chlorophenoxy)-3', 4', 5'-trichloroanilide. | 260 | (C-27) |
| (A-3) | (B-6) | do | 3-chloro-4-(4-chlorophenoxy)-4'-bromocarbanilide | | (C-28) |
| (A-12) | (B-3) | do | 3-chloro-4-(2-tertiary butyl-4-chloro-phenoxy)-4'-chlorocarbanilide. | | (C-29) |
| (A-13) | (B-2) | do | 4-(2-methyl-4-chloro-phenoxy)-3', 4'-dichlorocarbanilide. | | (C-30) |
| (A-1) | (B-7) | do | 4-(4-chlorophenoxy)-2'-methyl-3'-nitro-4', 5'-dichlorocarbanilide. | | (C-31) |

The complexes heretofore referred to are hereinafter known as complexes M and complexes N.

Complexes M are of the formula:

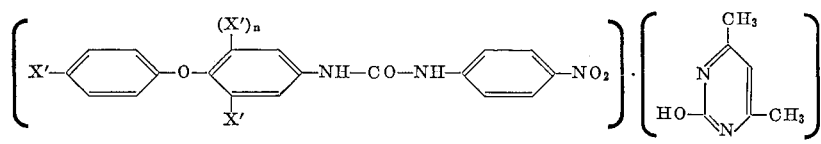

wherein each X' is independently selected from the group consisting of bromine and chlorine and n is zero or 1.

Said complexes M are produced by merely mixing together in an appropriate solvent, such as methanol, etc., 1 mole of 2-hydroxy-4,6-dimethyl-pyrimidine and 1 mole of carbanilide of the formula:

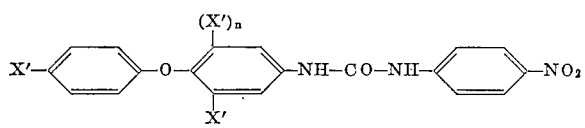

Complexes N are of the formula:

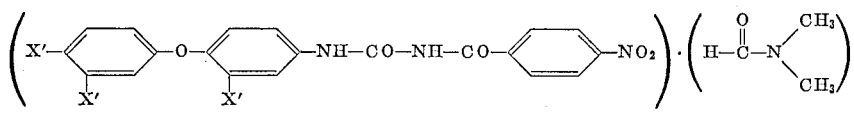

wherein each X' is a halogen independently selected from the group consisting of bromine and chlorine.

Said complexes N are produced by merely mixing together in an appropriate solvent such as ether, etc. 1 mole of dimethyl formamide and 1 mole of carbanilide of the formula:

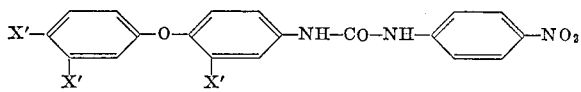

The following are some specific examples of complexes of this invention and methods for producing them, all given by way of illustration and not limitation.

Various complexes, namely those hereinafter known as (C-32), (C-33) and (C-34) may be readily produced. (C-32) and (C-33) were produced by merely mixing together in methanol 1 mole proportion of 2-hydroxy-4,6-dimethyl-pyrimidine and 1 mole proportion of respective Products (C-11) and (C-1). Complex (C-34) was produced by merely mixing together in ether 1 gram mole of (C-12) and 1 gram mole of dimethyl formamide.

The complex (C-32) had a melting point of 222-223° C.; and complex (C-34) had a melting point of 186° C. and upon continued heating 286° C.

Anticoccidial activity of the compounds of this invention was determined in the following manner:

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 100,000 sporulated oocysts of a specific specie of protozoan parasites of the genus Eimeria. On the sixth day after inoculation all surviving birds were sacrificed and weighed. The small intestines were pooled in water and homogenized in a blender. Two aliquots of the homogenate were examined for oocysts in a hemocytometer. If the total count of oocysts was less than 30, the compound was rated as active.

The activity of some of the representative compounds of the invention heretofore identified as (C–1)—(C–34) is set forth below, the dose level being the minimum level at which the compound was active:

DOSE LEVEL—PERCENT BY WEIGHT OF FEED

| Compound Number | E. acervulina | E. maxima |
|---|---|---|
| (C–1) | | 0.0125 |
| (C–2) | 0.025 | 0.0125 |
| (C–3) | 0.025 | 0.025 |
| (C–4) | 0.1 | 0.1 |
| (C–5) | 0.0125 | 0.0125 |
| (C–10) | 0.05 | 0.05 |
| (C–11) | 0.025 | 0.0125 |
| (C–14) | 0.025 | 0.025 |
| (C–15) | 0.05 | 0.025 |
| (C–16) | 0.0125 | 0.0125 |
| (C–17) | | 0.05 |
| (C–18) | | 0.05 |
| (C–22) | | 0.1 |
| (C–24) | 0.05 | 0.025 |
| (C–25) | 0.025 | 0.025 |
| (C–26) | | 0.0125 |
| (C–27) | 0.05 | 0.05 |
| (C–28) | 0.025 | 0.025 |
| (C–29) | | 0.05 |
| (C–30) | | 0.05 |
| (C–31) | | 0.025 |
| (C–33) | | 0.025 |
| (C–34) | 0.006 | 0.0125 |

In addition to the anticoccidial properties of the compounds of this invention, they also possess antischistosomal activity. Product (C–1) is one of the most active antischiostosomal compounds of the invention and it has been found that its activity in this respect is greater than that of antimony tartrate.

It is to be understood that any departure from the aforesaid description which is within the spirit of the present invention is intended to be included within the scope of the claims.

It is also to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to my novel composition of matter herein claimed without departing from the spirit of the invention. Particularly it is to be understood that in said claims ingredients or components recited in the singular are intended to include compatible mixtures of said ingredients wherever the sense permits.

We claim:
1. A compound selected from the group consisting of (1) compounds of the formula:

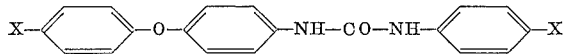

wherein each X is independently selected from the group consisting of chlorine, bromine, and nitro; and (2) compounds of the same formula as (1) except that a hydrogen in at least one of the rings of (1) is replaced by a substituent selected from the group consisting of chlorine, bromine, nitro and lower alkyl radicals.

2. A compound selected from the group consisting of (1) compounds of the formula:

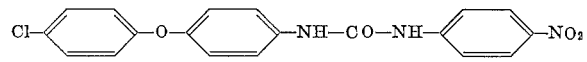

and (2) compounds of the same formula as (1) except that a hydrogen of at least one of the rings of (1) is replaced by a substituent selected from the group consisting of chlorine, bromine, nitro and lower alkyl radicals.

3. A compound selected from the group consisting of (1) compounds of the formula:

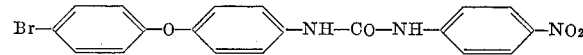

and (2) compounds of the same formula as (1) except that a hydrogen of at least one of the rings of (1) is replaced by a substituent selected from the group consisting of chlorine, bromine, nitro and lower alkyl radicals.

4. A compound selected from the group consisting of (1) compounds of the formula:

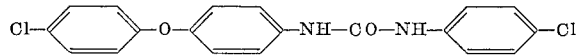

and (2) compounds of the same formula as (1) except that a hydrogen of a least one of the rings of (1) is replaced by a substituent selected from the group consisting of chlorine, bromine, nitro and lower alkyl radicals.

5. A compound selected from the group consisting of (1) compounds of the formula:

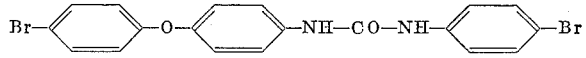

and (2) compounds of the same formula as (1) except that a hydrogen of at least one of the rings of (1) is replaced by a substituent selected from the group consisting of chlorine, bromine, nitro and lower alkyl radicals.

6. A compound selected from the group consisting of (1) compounds of the formula:

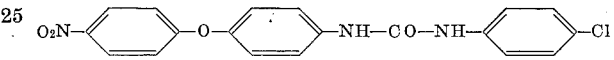

and (2) compounds of the same formula as (1) except that a hydrogen of at least one of the rings of (1) is replaced by a substituent selected from the group consisting of chlorine, bromine, nitro and lower alkyl radicals.

7. A compound selected from the group consisting of (1) compounds of the formula:

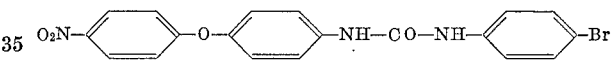

and (2) compounds of the same formula as (1) except that a hydrogen of at least one of the rings of (1) is replaced by a substituent selected from the group consisting of chlorine, bromine, nitro and lower alkyl radicals.

8. A compound selected from the group consisting of (1) compounds of the formula:

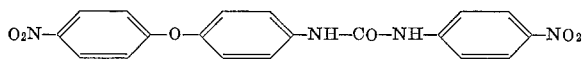

and (2) compounds of the same formula as (1) except that a hydrogen of at least one of the rings of (1) is replaced by a substituent selected from the group consisting of chlorine, bromine, nitro and lower alkyl radicals.

9. A compound of the formula:

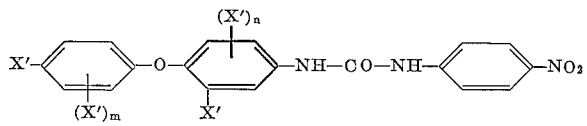

wherein each X' is a halogen independently selected from the group consisting of chlorine and bromine, and $n$ is selected from the group consisting of zero and one, and $m$ is selected from the group consisting of zero and one, the sum of $m$ and $n$ is selected from the group consisting of zero and one.

10. A compound of the formula:

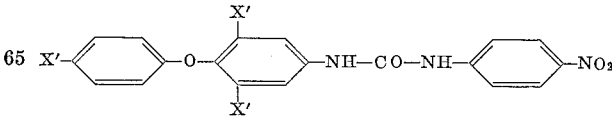

wherein each X' is a halogen independently selected from group consisting of bromine and chlorine.

11. A compound of the formula:

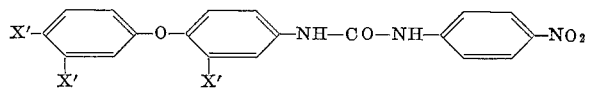

wherein each X' is a halogen independently selected from the group consisting of bromine and chlorine.

12. A compound of the formula:

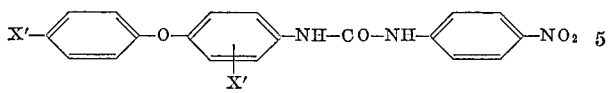

wherein each X' is a halogen independently selected from the group consisting of chlorine and bromine.

13. A compound of the formula:

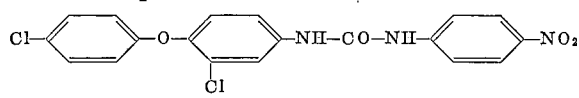

14. A compound of the formula:

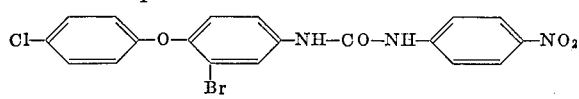

15. A compound of the formula:

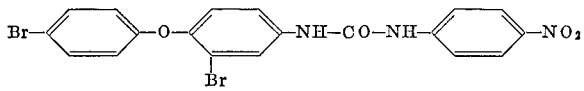

16. A compound of the formula:

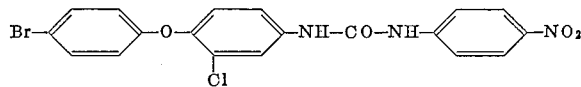

17. A complex of the formula:

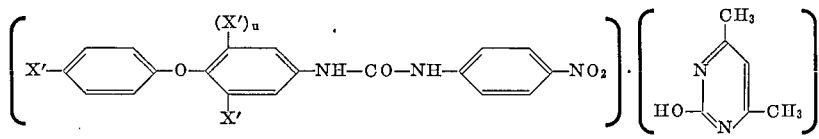

with each X' being a halogen independently selected from the group consisting of bromine and chlorine; and $n$ is selected from the group consisting of zero and 1.

18. A complex of the formula:

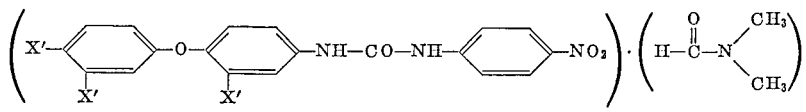

with each X' being a halogen independently selected from the group consisting of bromine and chlorine.

References Cited by the Examiner

UNITED STATES PATENTS

| | | | |
|---|---|---|---|
| 2,731,382 | 1/1956 | Basso et al. | 167—53.1 |
| 2,731,383 | 1/1956 | O'Neill et al. | 167—53.1 |
| 2,857,430 | 10/1958 | Applegath | 260—553 |
| 2,876,260 | 3/1959 | Huyser | 260—553 |
| 2,879,201 | 3/1959 | Essen | 167—53.1 |
| 2,951,010 | 8/1960 | O'Neill et al. | 167—53.1 |

ALEX MAZEL, *Primary Examiner.*

JULIAN S. LEVITT, HENRY R. JILES, S. ROSEN, J. A. NARCAVAGE, *Assistant Examiners.*